United States Patent [19]

Hirohata et al.

[11] Patent Number: 4,983,998
[45] Date of Patent: Jan. 8, 1991

[54] FLASH DEVICE FOR CAMERA

[75] Inventors: Michio Hirohata; Kazuo Ikawa, both of Kanagawa; Kiyoshi Ikuta, Tokyo, all of Japan

[73] Assignee: Canon Kabushiki Kaisha, Tokyo, Japan

[21] Appl. No.: 452,596

[22] Filed: Dec. 19, 1989

[51] Int. Cl.$^5$ .............................................. G03B 15/05
[52] U.S. Cl. ............................. 354/149.1; 354/149.11
[58] Field of Search .............. 354/145.1, 149.1, 149.11

[56] References Cited

U.S. PATENT DOCUMENTS 3,720,145  3/1973  Johnson et al. .............. 354/149.1 X
4,914,461  4/1990  Hori ................................. 354/149.1

Primary Examiner—Michael L. Gellner
Attorney, Agent, or Firm—Robin, Blecker, Daley & Driscoll

[57] ABSTRACT

The present patent application discloses a flash device for camera, or a camera, including a light emitter for flash photography mounted about a pivot shaft on the camera body and a light condenser mounted about a pivot shaft on the photographic lens barrel which moves to vary the light distribution characteristics of the light emitter as the focal length of the photographic optical system varies, wherein when the flash device is in use, the light condenser moves as the focal length of the photographic optical system varies, thus making it possible to obtain the light distribution characteristic which is suited to the focal length of the photographic optical system, while when not in use, the light emitter and the light condenser are turned to be integrally housed in an appropriate plate of either the lens barrel or the camera body.

17 Claims, 4 Drawing Sheets

FLASH DEVICE FOR CAMERA

BACKGROUND OF THE INVENTION

1. Field of the Invention

This invention relates to flash devices for cameras and, more particularly, to flash devices for cameras which vary the light distribution characteristic with variation of the focal length of the photographic optical system, or cameras using the same device.

2. Description of the Related Art

There have been many previous proposals for applying this kind of flash device to cameras. For example, a camera provided with a zoom strobe that varies the light distribution characteristic as the photographic lens moves for zooming purposes is known in Japanese Laid-Open patent application No. Sho 54-50324 and others. Further, a bifocal camera which varies the angle of illumination of flash light by varying the distance from the light emission portion of the strobe to the Fresnel lens in synchronism with changing over between the two focal lengths, too, is known in Japanese Laid-Open patent application No. Sho 59-64820 and others.

In the above-described conventional examples, however, a premise is set forth that the light emitting portion of the strobe is one unit of box shape. The introduction of a capability that the light distribution characteristic of the strobe is varied in response to zooming of the photographic lens, or changing over between the two focal lengths gives rise to drawbacks as described below.

(1) In order to be built in the compact camera, the discharge tube and reflector of the strobe must be decreased in size since the strobe has the form of the box like unit. Hence, it results that, if, as in the recently developed cameras, the focal length is made longer, the amount of emitted flash light tends to be insufficient, because such increase of the focal length leads to an increase in the F-number.

(2) For the same reason, the Fresnel lens in the front panel of the strobe unit cannot be designed to be large in size. Hence, the flash light could not sufficiently be condensed as compared with the add-on strobe for use with the single-lens reflex camera.

(3) Even in the type of apparatus in which the distance between the light emitter of the strobe and the Fresnel lens is made to vary as has been described before, because the availability of the space for this purpose is limited, it is difficult to set a sufficiently long stroke of motion.

(4) If the light emitter or the reflector is chosen to be made movable, the operating mechanism therefor gets complicated. As this is combined with the requirement of building the strobe unit into the interior of the camera, light shielding means also must be provided. A surplus space which is occupied by this means has to be created.

SUMMARY OF THE INVENTION

With the foregoing in mind, the present invention has been made and its object is to provide a flash device for camera, or a camera, having light emitting means for flash photography positioned on a camera body, and light condensing means positioned on a photographic lens barrel that moves as the focal length of a photographic optical system varies and is arranged to vary the light distribution characteristic of the light emitting means according to the focal length of the photographic optical system, whereby a sufficient light distribution characteristic can be obtained without the necessity of using a complicated mechanism.

Another object of the invention is to provide a flash device for camera, or a camera, having first support means for pivotally supporting the light emitting means so that the light emitting means is turnable relative to the camera body, and second support means for pivotally supporting the light condensing means so that the light condensing means is turnable relative to the lens barrel, wherein when not in use, the light emitting means and the light condensing means are turned to be housed in an appropriate place of the lens barrel or the camera body, thus improving the portability, too.

Further objects of the invention will become apparent from the following description of embodiments thereof.

BRIEF DESCRIPTION OF THE DRAWINGS

FIG. 1 is a longitudinal section view of the camera shown in FIG. 2.

FIG. 2 is a schematic perspective view of a camera illustrating the state in which the flash device is housed.

FIG. 3 is a longitudinal section view of the camera shown in FIG. 4 in the wide-angle shooting state.

FIG. 4 is a schematic perspective view of the camera of FIG. 2 in the shooting position.

FIG. 5 is a longitudinal section view of the camera of FIG. 4 in the telephoto shooting state.

DETAILED DESCRIPTION OF THE PREFERRED EMBODIMENTS

Figure 1:
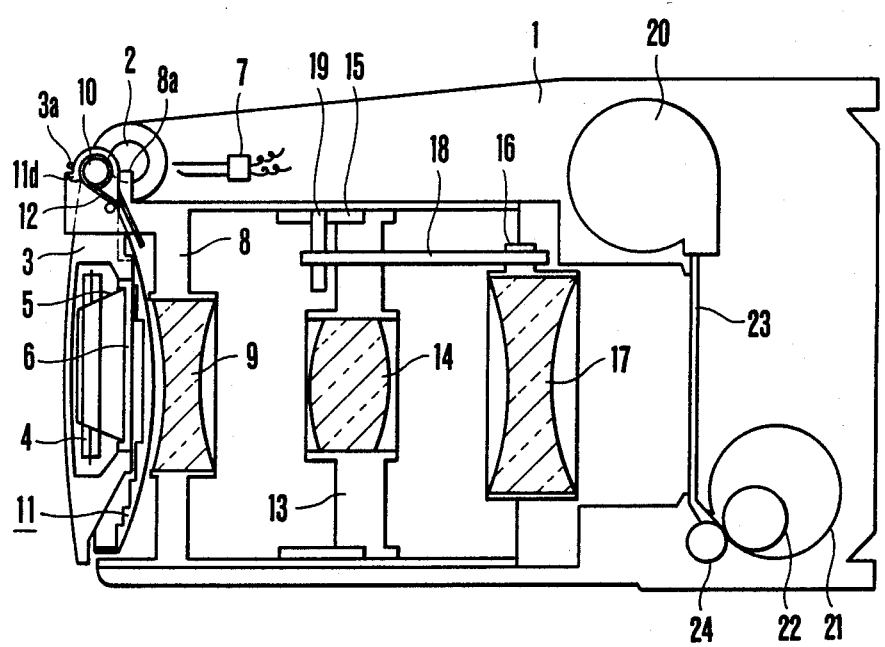
FIG. 1 to FIG. 5 show a first embodiment of the invention.
Figure 2:
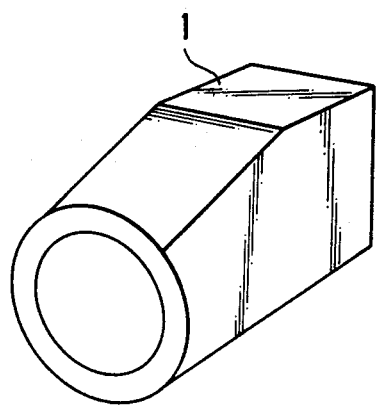
Figure 3:
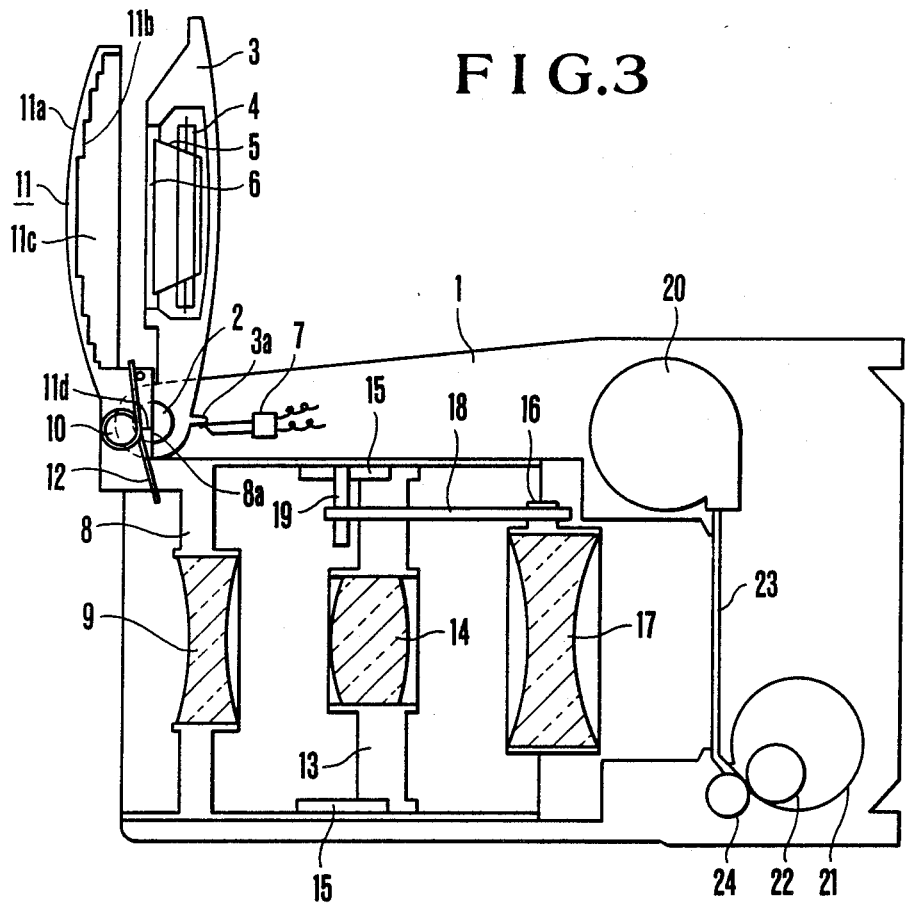

The present invention is described in connection with its embodiments by reference to the drawings. FIG. 1 through FIG. 5 show a first embodiment of the invention, with FIG. 1 in longitudinal section view showing the camera with the flash device housed therein, FIG. 2 in perspective view schematically showing the entirety of the camera in the position of FIG. 1, FIG. 3 in longitudinal section view showing the camera in the wide-angle flash photography, FIG. 4 in the perspective view schematically showing the camera and the flash device in the positions of FIG. 3, and FIG. 5 in longitudinal section view showing the camera in telephoto flash photography. In these drawings, a camera body 1 has its front panel in nearly round form and is long in the axial direction nearly to a square pillar form. A pivot shaft 2 lies at or near the top of the front end of the camera body 1. A flash light emitting portion 3 is pivotally mounted around the shaft 2 on the camera body 1. Further, a discharge tube 4, a reflector 5 and a transparent protector 6 in front of the reflector 5 constitute the light emitting unit of the flash device. A frictional member such as a wave washer (not shown) intervenes between the pivot shaft 2 and the hole for the shaft 2 of the flash light emitting portion 3 so that the flash light emitting portion 3 can be kept in any desired angular position relative to the camera body 1. A main switch 7 is positioned adjacent the pivot shaft 2 to hold the OFF state with its two contacts spaced apart in the portable state (the state in which the flash device is housed) shown in FIG. 1. An actuator portion 3a is formed in the neighborhood of the hole for the shaft of the flash light emitting portion 3 so that when the flash light emitting portion 3 is turned about 180° upward as shown in FIG. 3, this actuator portion 3a pushes the movable contact of the main switch 7, thus turning on the switch 7. A photographic lens barrel includes a first block 8 holding a first lens group 9. A pivot shaft 10 lies at or near the top of the front end of the first block 8. A Fresnel lens 11 serving as a light condensing member is mounted turnably around the pivot shaft 10 on the first block 8 and has its outer surface 11a formed to an arcuate shape convex toward the front and its inner surface 11b opposite to the outer surface 11a formed to Fresnel's configuration with a recess 11c. When housing the flash device as will be described later, the recess 11c contains the extruding portion (the protector 6 side) of the flash light emitting portion 3. A spring 12 urges the Fresnel lens 11 to turn in a clockwise direction. The bias force of the spring 12 is previously adjusted to a smaller strength than the frictional force of the flash light emitting portion 3 on the pivot shaft 2. Therefore, when the flash light emitting portion 3 is manually turned from the position of FIG. 1 in the clockwise direction, the Fresnel lens 11, too, turns in the clockwise direction in such a manner as to follow up the flash light emitting portion 3. The Fresnel lens 11 is provided with a stopper 11d near the center of rotation thereof. By this stopper 11d in abutting engagement on a square portion 8a above the first block 8, that clockwise movement is stopped (FIG. 3). A second block 13 holds a photographic second lens group 14. A differential cam 15 is arranged in unified form with the second block 13. A third block 16 holds a photographic third lens group 17 and fixedly carries a bar 18 at its right hand end as viewed in FIG. 1. The left hand end of the bar 18 is unified with a follower 19. A publicly known film cartridge 20 supplies film pulled therefrom past an exposure aperture 23 to a spool chamber 21, where the film is wound onto a spool 22. A roller 24 presses the film against the spool 22.

The operation of the camera of such construction of the present embodiment is described below. The housed state of the flash device is first described by reference to FIG. 1 and FIG. 2. In this state, the Fresnel lens 11 is hidden and housed in the recessed portion of the front of the camera body 1. At this time, because the front surface of the first group lens 9 is concave toward the front, the outer surface 11a of the Fresnel lens 11 is safeguarded against coming into contact with the first group lens 9. Meanwhile, the flash light emitting portion 3 also is likewise hidden and housed in the front of the camera body 1. For this purpose, the protector 6 side of the flash light emitting portion 3 is arranged to conform with the inner surface 11b of the Fresnel lens 11 so that the flash light emitting portion 3 is housed in the recess 11c. Incidentally, the form of the Fresnel lens 11 is stressed convex at the center of the area like a meniscus lens. Therefore, in actual practice, a sufficient strength is obtained and, at the same time, a space in which the flash light emitting portion 3 is housed can be secured.

Figure 4:
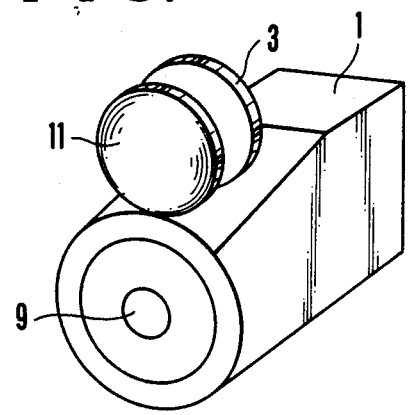

Next, a case where the flash device is used in wide-angle photography is described by reference to FIG. 3 and FIG. 4. To make preparation for this state, the user will put his finger on the lower end of the flash light emitting portion 3 in the state of FIG. 1 and then turn it around the pivot shaft 2 to 180° or so clockwise. As has been described before, such movement of the flash light emitting portion 3 is automatically followed by the clockwise movement of the Fresnel lens 11, too, around the pivot shaft 10 to 180° or so. Thus, the Fresnel lens 11 and the flash light emitting portion 3 are extended as shown in FIG. 3. And, they are spaced apart by a predetermined distance, since the layout has been such that the pivot shaft 10 for the Fresnel lens 11 is ahead (on the left side as viewed in FIG. 3) of the pivot shaft 2 for the flash light emitting portion 3. Therefore, when the flash device is put into use, the space between the flash light emitting portion 3 and the Fresnel lens 11 gets wider as compared with when the flash device is housed in the position of FIG. 1 to thereby, allow the Fresnel lens 11 to readily produce a light condensing effect. Moreover, the flash light emitting portion 3 and the Fresnel lens 11 when extended as shown in FIG. 3 are axially aligned to each other and operate with selection of one of the light distribution characteristics which is adapted to wide-angle photography and corresponds to a given zooming position of the photographic optical system. Further, such upward turning movement of the flash light emitting portion 3 to the usable position of the flash device also causes the main switch 7 to be turned on by the actuator portion 3a of the flash light emitting portion 3 as has been described before. Thereby, a shutter release button (not shown) and others are rendered operable. Thus, the camera is prepared for a shot.

Figure 5:
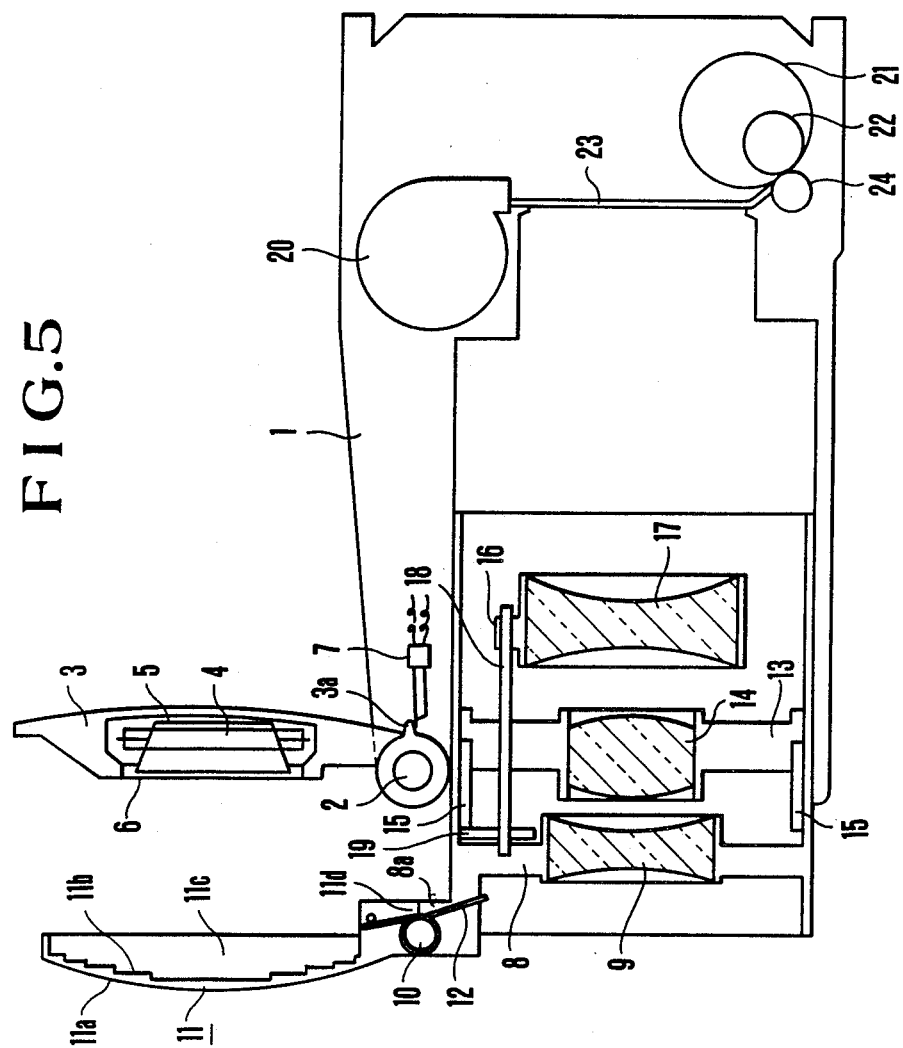

Next, another case where the flash device is used in telephoto photography is described by reference to FIG. 5. By means of a lens operating mechanism (not shown), the user will first move the first block 8 axially forward (to the left in FIG. 3) from the position of FIG. 3 either manually or by a motorized drive source. Along with the movement of the first block 8, the Fresnel lens 11, too, is moved in the same direction because it is carried in unison on the first block 8. As the distance between the Fresnel lens 11 and the flash light emitting portion 3 increases with increase of the focal length of the photographic optical system, the light issuing from the flash light emitting portion 3 gets more condensed with good efficiency according to the light distribution characteristic suited to a given value of the focal length of the photographic optical system. It is to be noted that in the state of FIG. 5, the air separations between the first group lens 9 and the second lens group 14 and between the second group lens 14 and the third lens group lens 17 have been varied from those in the state of FIG. 3 so that the photographic optical system is changed over to the telephoto side.

Now suppose, for example, leaving the camera body 1 in such telephoto photography, the user turns the flash light emitting portion 3 in the counterclockwise direction. Upon turning of the flash light emitting portion 3, the actuator portion 3a moves away from the movable contact of the main switch 7. Thus, the main switch 7 turns off. When such turning off of the main switch 7 is detected, then, for example, an electric motor (not shown) for driving the lens barrel is energized to move the first block 8 to the right until the position of FIG. 3 is reached. Thereby, both of the pivot shafts 2 and 10 of the flash light emitting portion 3 and the Fresnel lens 11 are brought into close proximity. The user then is able to house them as a unit into the front of the first lens group 9.

Figure 6:
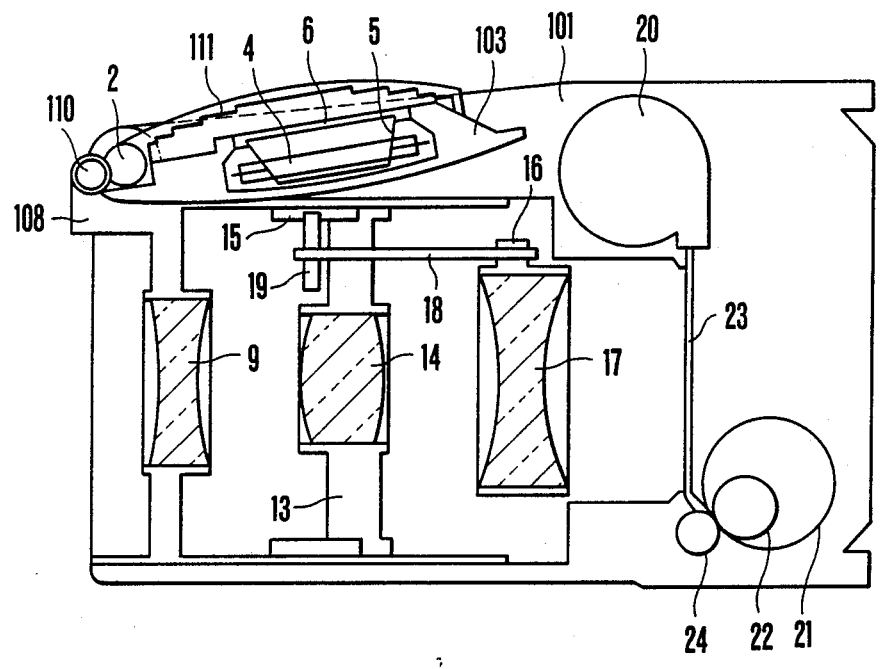
FIG. 6 a longitudinal section view of a second embodiment of the invention, illustrating the state in which the flash device is housed.

FIG. 6 shows another embodiment of the invention where the similar constituent elements to those of the first embodiment are denoted by the same reference numerals and their explanation is omitted. This figure shows the housed state of the flash device. By the pivot shaft 2 on the top of the front end of a camera body 101, a flash light emitting portion 103 is turnably mounted. Further, by a pivot shaft 110 on the top of the front end of a first block 108, a Fresnel lens 111 is turnably mounted on the first block 108. When the flash device is not in use, the flash light emitting portion 103 and the Fresnel lens 111 are housed in an accommodation space in the upper panel of the camera body 101. When using the flash device, the user may turn the flash light emitting portion 103 and the Fresnel lens 111 as a unit by about 90° in the counterclockwise direction. Then, likewise as in FIG. 3, the flash light emitting portion 103 and the Fresnel lens 111, while keeping a predetermined separation, are held with their optical axes in coincidence. The subsequent operation of transferring from the wide-angle photography state to the telephoto photography state is similar to that described in connection with the first embodiment. Therefore, its explanation is omitted.

According to this embodiment, the following advantages are obtained. It becomes possible that the flash light emitting portion and the Fresnel lens are housed in the relatively wide dead space of the upper panel of the camera body in such a way as to be housed in a closer relation than when they are housed in the front side of the first group lens as in the first embodiment. Further, when in setting up the flash device, about a half of the range of the first embodiment suffices for turning the flash light emitting portion and the Fresnel lens. Therefore, the manageability is better and more practical. Also, since the flash device is not housed in front of the photographic optical system as in the first embodiment, when photography with no necessity of flash light is performed, it is also possible to leave the flash device housed in the upper panel of the camera body.

Though, in the above-described embodiments, the present invention has been applied to the camera whose photographic optical system varies its focal length continuously, or the so-called zoom camera, it is to be understood that the present invention is applicable to any other types of camera in which the focal length varies in a plurality of discrete values, for example, the bifocal camera.

Also, though, in the foregoing embodiments, the pivot shaft for the light emitting member is located on the camera body, this may otherwise be located on the lens barrel.

As has been described above, according to the invention, its embodiments produce the following advantages:

(1) When the flash device is not in use, the flash device can be housed in a relatively large dead space in the camera, say, the front of the photographic lens, or the side of the camera body. Therefore, the necessity of making the flash device in a compact and box-like form is obviated. As the discharge tube and the reflector both may be increased in size, it becomes possible to obtain a sufficient amount of flash light in correspondence to a long focal length.

(2) From the same reason, the Fresnel lens in front of the flash light emitting portion may be increased in size. Hence, it is possible to sufficiently condense the flash light like the add-on flash device for the single-lens reflex camera.

(3) Since the flash light emitting portion and the Fresnel lens can be extended away from the housing position in the camera body, and the Fresnel lens is made to move along the optical axis as the lens barrel moves, it becomes possible to set out a sufficient stroke for the Fresnel lens so that in telephoto photography, the flash light is condensed with good efficiency.

(4) Because it is the Fresnel lens that is moved along the optical axis when the lens barrel moves, so as to vary the light distribution characteristic to the flash light, the structure of construction is simpler and the cost is cheaper than with the light emitting portion or the reflector made movable as in the prior art. Also, since the flash device is not made to be built in the camera, there is no need to shield light. Hence, the surplus space which would otherwise be necessary to shield light can be saved.

(5) Since the Fresnel lens is made to be a meniscus lens with its outer side (the opposite side to the light emitting portion) of convex curvature, because it becomes possible to design coarse Fresnel's cuts, the loss of the flash light by the Fresnel lens can be minimized and it can be condensed with better efficiency.

(6) Despite the construction of the flash light emitting portion and the Fresnel lens in the form of separate members both are housed as a unit. Hence, the housing operation is very quick and easy, the bulk and size of the camera can be minimized, and the practicability is very high.

What is claimed is:

1. A flash device for camera, or a camera, comprising:
(A) light emitting means for flash photography, said light emitting means being located on a camera body; and
(B) light distributing means for varying a light distribution characteristic of said light emitting means, said light distributing means being located on a photographic lens barrel which moves as a focal length of a photographic optical system varies, and being arranged to vary the light distribution characteristic of said light emitting means in accordance with the focal length of said photographic optical system.

2. A flash device, or a camera, according to claim 1, further comprising:
(C) first support means for turnable supporting said light emitting means relative to said camera body; and
(D) second support means for turnably supporting said light distributing means relative to said photographic lens barrel,
wherein said first and second support means cause said light emitting means and said light distributing means to be integrally housed in an appropriate place of said photographic lens barrel.

3. A flash device, or a camera, according to claim 2, wherein said appropriate place of said photographic lens barrel includes the front of a lens in said lens barrel.

4. A flash device, or a camera, according to claim 1, further comprising:
(C) first support means for turnably supporting said light emitting means relative to said camera body; and
(D) second support means for turnably supporting said light distributing means relative to said photographic lens barrel,
wherein said first and second support means cause said light emitting means and said light distributing means to be integrally housed in an appropriate place of said camera body.

5. A flash device, or a camera, according to claim 1, further comprising:
   support means for turnably supporting said light emitting means relative to said camera body, said support means causing said light emitting means to be housed in an appropriate place of said photographic lens barrel.

6. A flash device, or a camera, according to claim 5, wherein said appropriate place of said photographic lens barrel includes the front of a lens in said lens barrel.

7. A flash device, or a camera, according to claim 1, further comprising:
   support means for turnably supporting said light emitting means relative to said camera body, said support means causing said light emitting means to be housed in an appropriate place of said camera body.

8. A flash device, or a camera, according to claim 1, further comprising:
   support means for turnably supporting said light distributing means relative to said photographic lens barrel, said support means causing said light distributing means to be housed in an appropriate place of said photographic lens barrel.

9. A flash device, or a camera, according to claim 8, wherein said appropriate place of said photographic lens barrel includes the front of a lens in said lens barrel.

10. A flash device, or a camera, according to claim 1, further comprising:
    support means for turnably supporting said light distributing means relative to said camera body, said support means causing said light distributing means to be housed in an appropriate place of said camera body.

11. A flash device, or a camera, according to claim 1, further comprising:
    (C) support means for turnably supporting said light emitting means relative to said camera body; and
    (D) a main switch arranged to act in response to turning of said light emitting means.

12. A flash device, or a camera, according to claim 1, further comprising:
    (C) first support means for turnably supporting said light emitting means relative to said camera body; and
    (D) second support means for turnably supporting said light distributing means relative to said photographic lens barrel, said second support means including interlocking means for causing said light distributing means in association with turning of said light emitting means.

13. A flash device, or a camera, according to claim 12, wherein said interlocking means includes a resilient member.

14. A flash device for camera, or a camera, comprising:
    (A) light emitting means for flash photography; and
    (B) light distributing means for varying a light distribution characteristic of said light emitting means, said light distributing means being located on a photographic lens barrel which moves as a focal length of a photographic optical system varies, and being arranged to vary the light distribution characteristic of said light emitting means in accordance with the focal length of said photographic optical system.

15. A flash device, or a camera, according to claim 14, further comprising:
    support means for turnably supporting said light distributing means relative to said photographic lens barrel, said support means causing said light distributing means to be housed in an appropriate place of said photographic lens barrel.

16. A flash device, or a camera, according to claim 15, wherein said appropriate place of said photographic lens barrel includes the front of a lens in said lens barrel.

17. A flash device, or a camera, according to claim 14, further comprising:
    support means for turnably supporting said light distributing means relative to said camera body, said support means causing said light distributing means to be housed in an appropriate place of said camera body.

* * * * *